US010414913B2

(12) United States Patent
Khambati et al.

(10) Patent No.: US 10,414,913 B2
(45) Date of Patent: *Sep. 17, 2019

(54) ARTICLES OF MANUFACTURE INCLUDING MACROMOLECULAR BLOCK COPOLYMERS

(71) Applicant: International Business Machines Corporation, Armonk, NY (US)

(72) Inventors: Suraush Q. Khambati, Wappingers Falls, NY (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 612 days.

This patent is subject to a terminal disclaimer.

(21) Appl. No.: 15/095,890

(22) Filed: Apr. 11, 2016

(65) Prior Publication Data

US 2017/0292637 A1     Oct. 12, 2017

(51) Int. Cl.
  *C08L 23/16*  (2006.01)
  *C08G 81/02*  (2006.01)
  *F16L 11/12*  (2006.01)
  *F16L 27/08*  (2006.01)

(52) U.S. Cl.
  CPC .......... *C08L 23/16* (2013.01); *C08G 81/021* (2013.01); *F16L 11/12* (2013.01); *F16L 27/0861* (2013.01)

(58) Field of Classification Search
  CPC ........ C08L 23/16; C08G 81/021; F16L 11/12; F16L 27/0861
  See application file for complete search history.

(56) References Cited

U.S. PATENT DOCUMENTS

| 4,286,022 | A  | 8/1981  | Vermillion et al. |
| 5,775,779 | A  | 7/1998  | Abu-Isa et al. |
| 6,673,857 | B1 | 1/2004  | Knoll et al. |
| 6,790,908 | B2 | 9/2004  | Bendejacq et al. |
| 6,875,710 | B2 | 4/2005  | Eaton et al. |
| 7,115,691 | B2 | 10/2006 | Alvarado et al. |
| 8,536,667 | B2 | 9/2013  | De Graff et al. |
| 8,631,846 | B2 | 1/2014  | Custodero et al. |

(Continued)

FOREIGN PATENT DOCUMENTS

| JP | 2013527869 A | 7/2013 |
| WO | 2012071537 A2 | 5/2012 |

OTHER PUBLICATIONS

Buckhom Rubber Products, Inc., "Sequential Co-Extrusion: Process Description", "Sequential Co-Extrusion: Process Description", (2007) http://www.buckhornrubber.com/sequential-extrusion.aspx, 2 pages. [Available Online] [Accessed Online Feb. 27, 2017].

(Continued)

*Primary Examiner* — Michael C Miggins
(74) *Attorney, Agent, or Firm* — Patterson + Sheridan, LLP

(57) ABSTRACT

An article of manufacture includes a macromolecular block copolymer. The macromolecular block copolymer includes a first extruded high molecular weight polymer and a second extruded high molecular weight polymer bonded to the first extruded high molecular weight polymer. The first extruded high molecular weight polymer has a first characteristic rigidity value along a first length, and the second extruded high molecular weight polymer has a second characteristic rigidity value along a second length that is different from the first characteristic rigidity value.

19 Claims, 8 Drawing Sheets

(56) References Cited

U.S. PATENT DOCUMENTS

| | | |
|---|---|---|
| 8,845,581 B2 | 9/2014 | Holman et al. |
| 8,894,906 B2 | 11/2014 | Arney et al. |
| 8,905,772 B2 | 12/2014 | Rogers et al. |
| 9,140,678 B2 | 9/2015 | Soccol et al. |
| 2010/0063223 A1 | 3/2010 | Weber et al. |
| 2011/0120583 A1 | 5/2011 | Coutarel et al. |
| 2011/0253943 A1 | 10/2011 | Liang et al. |
| 2012/0108694 A1 | 5/2012 | Malet et al. |
| 2014/0011929 A1 | 1/2014 | Knoll et al. |
| 2015/0037557 A1 | 2/2015 | Wang et al. |

OTHER PUBLICATIONS

"Sequential Co-Extrusion: Process Description", "Sequential Co-Extrusion: Process Description", Buckhorn Rubber Products Inc., http://www.buckhornrubber.com/sequential-extrusion.aspx, 1 page.

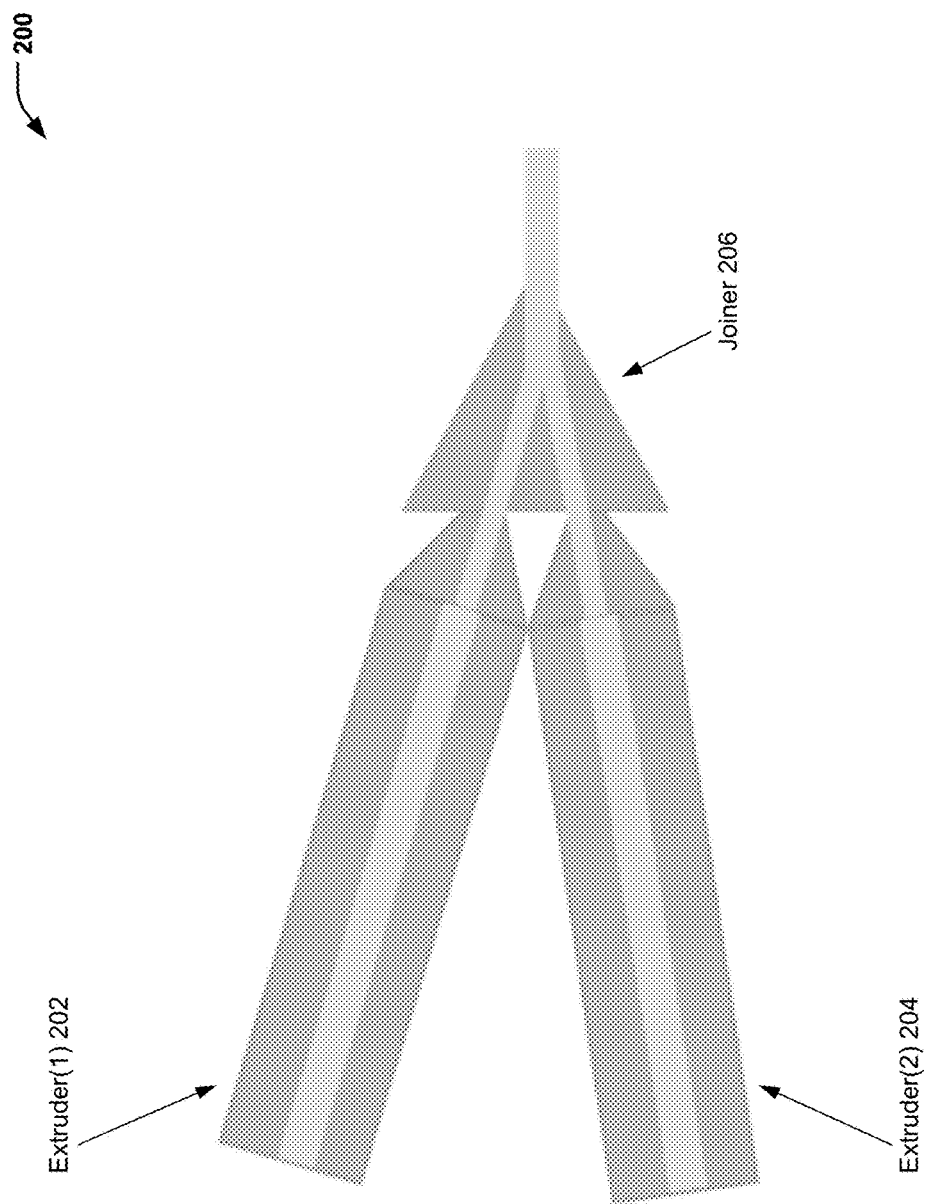

ARTICLES OF MANUFACTURE INCLUDING MACROMOLECULAR BLOCK COPOLYMERS

I. FIELD OF THE DISCLOSURE

The present disclosure relates generally to articles of manufacture including macromolecular block copolymers.

II. BACKGROUND

In the manufacturing of polymers, it may be desirable to have different material properties in different regions of an article (e.g., along a length of a linear article).

III. SUMMARY OF THE DISCLOSURE

According to an embodiment, an article of manufacture including a macromolecular block copolymer is disclosed. The macromolecular block copolymer includes a first extruded high molecular weight polymer and a second extruded high molecular weight polymer bonded to the first extruded high molecular weight polymer. The first extruded high molecular weight polymer has a first characteristic rigidity value along a first length, and the second extruded high molecular weight polymer has a second characteristic rigidity value along a second length that is different from the first characteristic rigidity value.

According to another embodiment, a multi-layered linear article includes a polymeric matrix material layer and a reinforcement layer bonded to the polymeric matrix material layer. The reinforcement layer includes a macromolecular block copolymer that includes a first extruded high molecular weight polymer, a second extruded high molecular weight polymer bonded to the first extruded high molecular weight polymer, and a third extruded high molecular weight polymer bonded to the second extruded high molecular weight polymer. The first extruded high molecular weight polymer has a first characteristic rigidity value along a first length, and the second extruded high molecular weight polymer has a second characteristic rigidity value along a second length that is less than the first characteristic rigidity value. The third extruded high molecular weight polymer has a third characteristic rigidity value along a third length that is different from the second characteristic rigidity value.

According to another embodiment, a reinforced hose includes a polymeric matrix material layer and a reinforcement layer bonded to the polymeric matrix material layer. The reinforcement layer includes a macromolecular block copolymer that includes a first extruded high molecular weight polymer, a second extruded high molecular weight polymer bonded to the first extruded high molecular weight polymer, and a third extruded high molecular weight polymer bonded to the second extruded high molecular weight polymer. The first extruded high molecular weight polymer has a first characteristic rigidity value along a first length, and the second extruded high molecular weight polymer has a second characteristic rigidity value along a second length that is less than the first characteristic rigidity value. The third extruded high molecular weight polymer has the first characteristic rigidity value along a third length.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

FIG. 2 is a diagram of an example of an extrusion setup to generate a macromolecular block copolymer, according to one embodiment;

V. DETAILED DESCRIPTION

Figure 1:
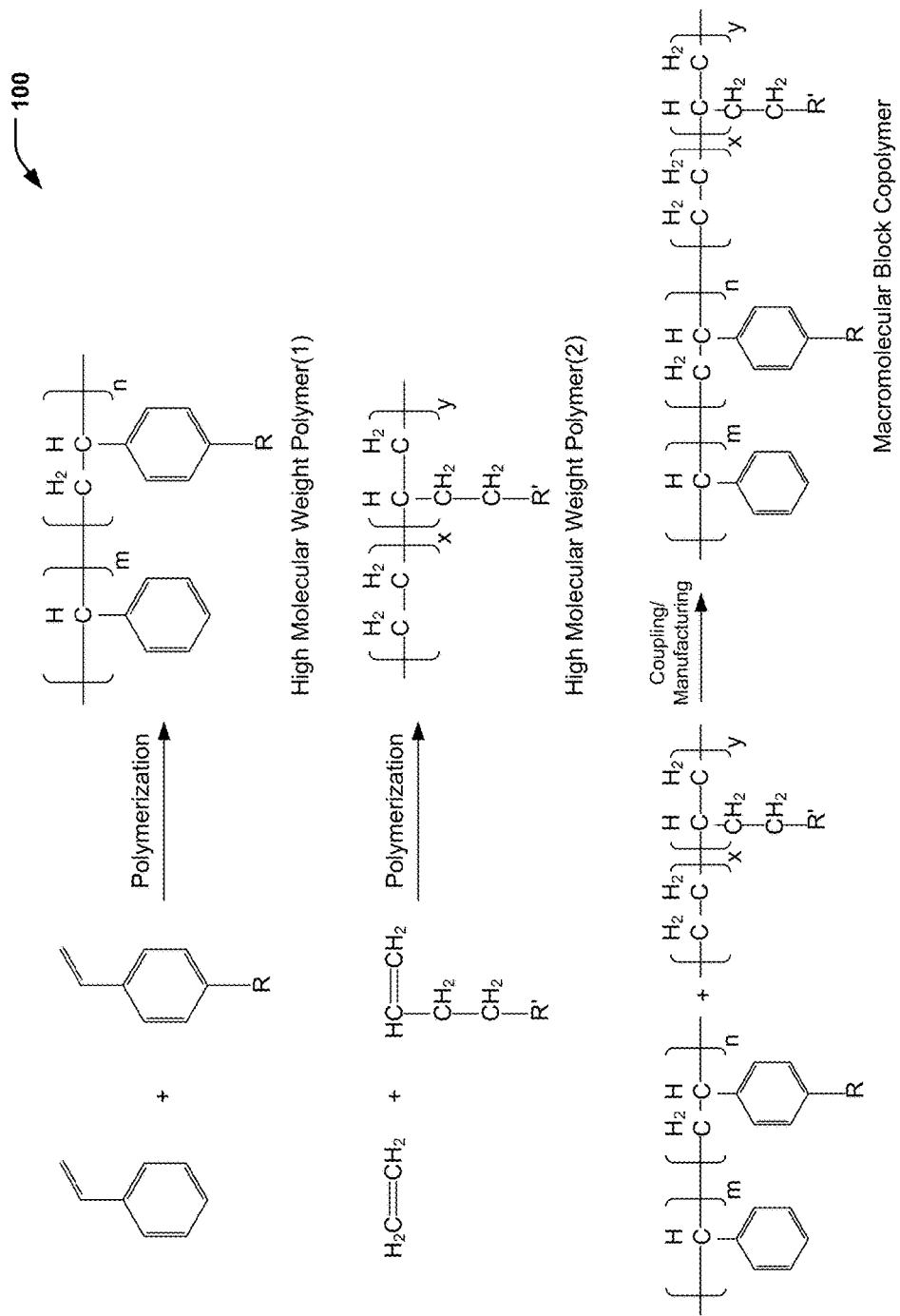
FIG. 1 is a chemical reaction diagram depicting a process of forming a macromolecular block copolymer, according to one embodiment.

The present disclosure describes "macromolecular" block copolymers, processes for forming macromolecular block copolymers, and articles of manufacture formed from the macromolecular block copolymers. As used herein, the term "macromolecular" block copolymers is used to describe a polymeric material that includes at least two high molecular weight polymers that are joined together at one or more locations. The macromolecular block copolymers have different material properties at a macromolecular level, with the material properties at a particular location associated with a particular "block" of high molecular weight polymer that is present at the particular location.

In contrast to "true" block copolymers that exhibit homogeneous material properties at the macromolecular level, the macromolecular block copolymers of the present disclosure may exhibit one set of material properties in one macromolecular region and a different set of material properties in another macromolecular region. As an example, in the case of a linear article, the rigidity/flexibility along a first length of the linear article (corresponding to a first high molecular weight polymer of the macromolecular block copolymer) may be greater than the rigidity/flexibility along a second length of the linear article (corresponding to a second high molecular weight polymer of the macromolecular block copolymer).

As further described herein, the high molecular weight polymers that are used to form the macromolecular block copolymers of the present disclosure may include side-chain functional groups that may be selected in order to facilitate chemical bonding to a particular polymer matrix material. As an illustrative, non-limiting example, when the polymer matrix is EPDM rubber (ethylene propylene diene monomer rubber), norbornene side-chain functional groups may be incorporated into at least a portion of the high molecular weight polymers in order to bond the high molecular weight polymers into the EPDM rubber polymer matrix. In other cases, the side-chain functional groups may include norbornenes, amines, hydroxyls, or combinations thereof (among other alternatives) that may be selected for a particular type of polymer matrix material.

The macromolecular block copolymers of the present disclosure may be useful in various applications where different macromolecular properties are desirable at different locations. As an illustrative, non-limiting example, the macromolecular block copolymers of the present disclosure may be used to form a reinforcement for a multi-layered rubber cooling hose of a liquid-cooled computing system in which variable flexibility/rigidity may be desirable at different locations along the length of the rubber cooling hose. For example, a rubber cooling hose may be used to transport a fluid (e.g., water) from one location (e.g., a pump unit, a radiator, heat exchanger, etc.) to another location (e.g., a cold plate). In this case, it may be desirable for a reinforcement for the rubber water cooling hose to be relatively flexible at most locations and to be relatively rigid at other locations (e.g., at both ends for attachment). In this example, a macromolecular block copolymer of the present disclosure may be used as the reinforcement, with a first high molecular weight polymer that is relatively rigid being used at one or more locations (e.g., at the ends) and a second high molecular weight polymer that is relatively flexible being used at one or more locations (e.g., along the remaining length of the hose).

As described further herein, the macromolecular block copolymers of the present disclosure may be formed using an extrusion setup that includes two (or more) extruders (e.g., via reactive extrusion). A first high molecular weight polymer may be extruded through a first extruder, and a second high molecular weight polymer may be extruded through a second extruder. Extrusion parameters (e.g., timing, temperature, etc.) may be selected such that when an end of a first segment corresponding to the first high molecular weight polymer is located at a joining block (also referred to herein as a "joiner"), a second segment corresponding to the second high molecular weight polymer is extruded into the joining block via the second extruder to bond the second segment to the end of the first segment.

To illustrate, in the case of a reinforcement for a linear rubber water cooling hose (e.g., having an overall length of six feet), it may be desirable to have a first rigid segment of a first length (e.g., one foot) at one end, a flexible segment of a second length (e.g., three feet), and a second rigid segment of a third length (e.g., one foot) at another end. In this example, the first length of relatively rigid high molecular weight polymer may be extruded using a first extruder, followed by the second length of relatively flexible high molecular weight polymer extruded using a second extruder, followed by the third length of the relatively rigid high molecular weight polymer extruder using the first extruder. As the macromolecular properties of the macromolecular block copolymer at a particular location are known based on the extrusion parameters, the extrusion setup may be used to form numerous segments that may be subsequently separated based on known locations of the individual segments.

Figure 4:
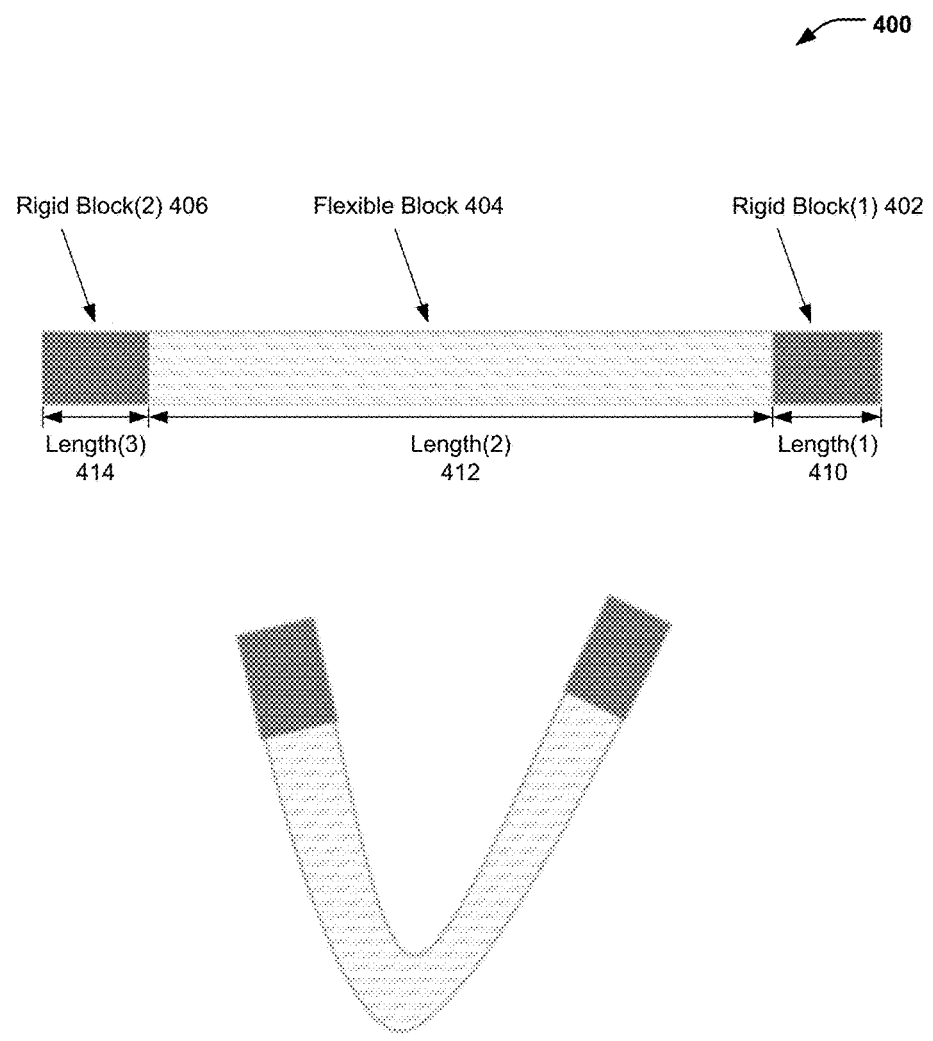
FIG. 4 is a diagram of an example of an article of manufacture formed from the macromolecular block copolymer of the present disclosure, according to one embodiment.
Figure 5:
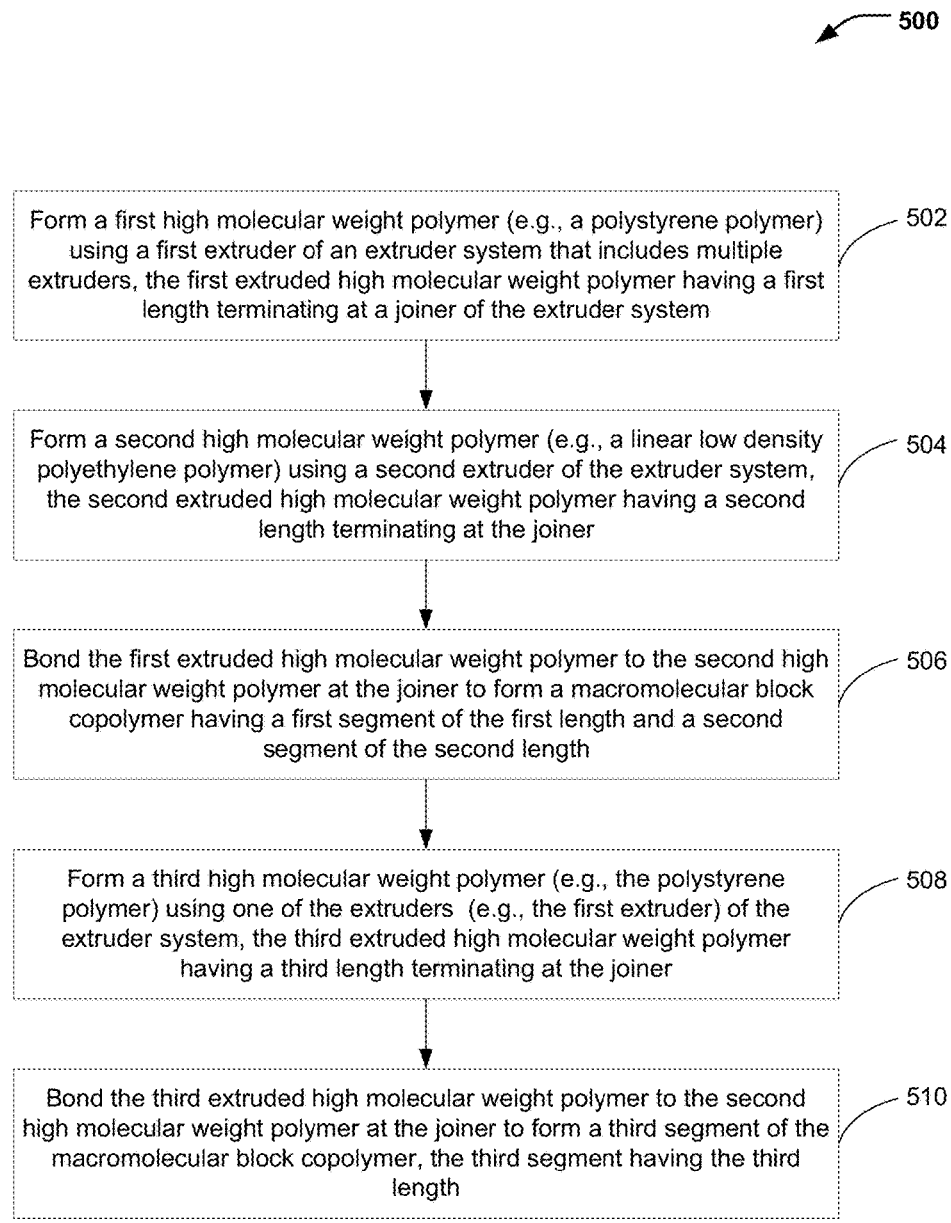
FIG. 5 is a flow diagram showing a particular embodiment of a process of forming an article of manufacture that includes a macromolecular block copolymer of the present disclosure.

FIG. 1 depicts an illustrative, non-limiting example of a process of forming a macromolecular block copolymer from two high molecular weight polymers. In alternative cases, a macromolecular block copolymer may be formed from more than two high molecular weight polymers. FIG. 2 depicts an illustrative, non-limiting example of an extrusion setup that includes two extruders to extrude two high molecular weight polymers into a joiner to form a macromolecular block copolymer (e.g., the macromolecular block copolymer of FIG. 1). In alternative cases, the extrusion setup may include more than two extruders to extrude more than two high molecular weight polymers. FIGS. 3A-3D depict various stages of an extrusion process using the extrusion setup of FIG. 2. FIG. 4 depicts an illustrative example of an article of manufacture (e.g., a reinforcement for a multi-layered rubber hose) that includes an example of a macromolecular block copolymer that includes two rigid blocks and one flexible block. In alternative cases, macromolecular block copolymers having an alternative number and/or arrangement of different high molecular weight polymer segments may be incorporated into various articles of manufacture (e.g., living hinges, etc.). FIG. 5 depicts an example of a process of forming an article of manufacture that includes a macromolecular block copolymer of the present disclosure.

According to an embodiment, a process of forming a macromolecular block copolymer is disclosed. The process includes forming a first high molecular weight polymer using a first extruder of an extruder system that includes multiple extruders. The first extruded high molecular weight polymer has a first length terminating at a joiner of the extruder system and has a first set of material properties along the first length. The process also includes forming a second high molecular weight polymer using a second extruder of the extruder system. The second extruded high molecular weight polymer has a second length terminating at the joiner of the extruder system and has a second set of material properties along the second length. The process further includes bonding the first extruded high molecular weight polymer to the second extruded high molecular weight polymer to form a macromolecular block copolymer having a first segment of the first length and a second segment of the second length.

According to another embodiment, a process of forming a macromolecular block copolymer is disclosed. The process includes forming a high molecular weight polystyrene (PS) polymer using a first extruder of an extruder system that includes multiple extruders. The extruded high molecular weight PS polymer has a first length terminating at a joiner of the extruder system. The process also includes forming a high molecular weight linear low density polyethylene (LLDPE) polymer using a second extruder of the extruder system. The extruded high molecular weight LLDPE polymer has a second length terminating at the joiner. The process further includes bonding the extruded high molecular weight PS polymer to the extruded high molecular weight LLDPE polymer to form a PS-LLDPE macromolecular block copolymer. The PS-LLDPE macromolecular block copolymer has a first segment of the first length and a second segment of the second length, and the first segment has a first characteristic rigidity value along the first length that is greater than a second characteristic rigidity value of the second segment along the second length.

According to another embodiment, a macromolecular block copolymer is disclosed that is formed by a process that includes forming a first high molecular weight polymer using a first extruder of an extruder system that includes multiple extruders. The first extruded high molecular weight polymer has a first length terminating at a joiner of the extruder system and has a first set of material properties along the first length. The process also includes forming a second high molecular weight polymer using a second extruder of the extruder system. The second extruded high molecular weight polymer has a second length terminating at the joiner of the extruder system and has a second set of material properties along the second length. The process further includes bonding the first extruded high molecular weight polymer to the second extruded high molecular weight polymer to form a macromolecular block copolymer having a first segment of the first length and a second segment of the second length.

According to an embodiment, an article of manufacture including a macromolecular block copolymer is disclosed. The macromolecular block copolymer includes a first extruded high molecular weight polymer and a second extruded high molecular weight polymer bonded to the first extruded high molecular weight polymer. The first extruded high molecular weight polymer has a first characteristic rigidity value along a first length, and the second extruded high molecular weight polymer has a second characteristic rigidity value along a second length that is different from the first characteristic rigidity value.

According to another embodiment, a multi-layered linear article includes a polymeric matrix material layer and a reinforcement layer bonded to the polymeric matrix material layer. The reinforcement layer includes a macromolecular block copolymer that includes a first extruded high molecular weight polymer, a second extruded high molecular weight polymer bonded to the first extruded high molecular weight polymer, and a third extruded high molecular weight polymer bonded to the second extruded high molecular weight polymer. The first extruded high molecular weight polymer has a first characteristic rigidity value along a first length, and the second extruded high molecular weight polymer has a second characteristic rigidity value along a second length that is less than the first characteristic rigidity value. The third extruded high molecular weight polymer has a third characteristic rigidity value along a third length that is different from the second characteristic rigidity value.

According to another embodiment, a reinforced hose includes a polymeric matrix material layer and a reinforcement layer bonded to the polymeric matrix material layer. The reinforcement layer includes a macromolecular block copolymer that includes a first extruded high molecular weight polymer, a second extruded high molecular weight polymer bonded to the first extruded high molecular weight polymer, and a third extruded high molecular weight polymer bonded to the second extruded high molecular weight polymer. The first extruded high molecular weight polymer has a first characteristic rigidity value along a first length, and the second extruded high molecular weight polymer has a second characteristic rigidity value along a second length that is less than the first characteristic rigidity value. The third extruded high molecular weight polymer has the first characteristic rigidity value along a third length.

According to an embodiment, a process of forming a macromolecular block copolymer includes forming a first high molecular weight polymer of a first length. The first high molecular weight polymer includes a first set of side-chain functional groups and has a first characteristic rigidity value along the first length. The process also includes forming a second high molecular weight polymer of a second length. The second high molecular weight polymer includes a second set of side-chain functional groups and has a second characteristic rigidity value along the second length that is less than the first characteristic rigidity value. The process further includes bonding the second high molecular weight polymer to the first high molecular weight polymer.

According to another embodiment, a process of forming a macromolecular block copolymer includes forming a high molecular weight polystyrene (PS) polymer of a first length. The high molecular weight PS polymer includes a first set of side-chain functional groups and has a first characteristic rigidity value along the first length. The process also includes forming a high molecular weight linear low density polyethylene (LLDPE) polymer of a second length. The high molecular weight LLDPE polymer includes a second set of side-chain functional groups and has a second characteristic rigidity value along the second length that is less than the first characteristic rigidity value. The process further includes bonding the high molecular weight LLDPE polymer to the high molecular weight PS polymer.

According to another embodiment, a macromolecular block copolymer is disclosed that is formed by a process that includes forming a first high molecular weight polymer of a first length. The first high molecular weight polymer includes a first set of side-chain functional groups and has a first characteristic rigidity value along the first length. The process also includes forming a second high molecular weight polymer of a second length. The second high molecular weight polymer includes a second set of side-chain functional groups and has a second characteristic rigidity value along the second length that is less than the first characteristic rigidity value. The process further includes bonding the second high molecular weight polymer to the first high molecular weight polymer.

Referring to FIG. 1, a chemical reaction diagram 100 illustrates a particular embodiment of a process of forming a macromolecular block copolymer. The first chemical reaction depicted at the top of FIG. 1 illustrates an example of the synthesis of a first high molecular weight polymer (identified as "High Molecular Weight Polymer(1)" in FIG. 1). The second chemical reaction depicted below the first chemical reaction in FIG. 1 illustrates an example of synthesis of a second high molecular polymer (identified as "High Molecular Weight Polymer(2)" in FIG. 1). The third chemical reaction depicted below the second chemical reaction in FIG. 1 illustrates an example of the formation of a macromolecular block copolymer by joining the first high molecular weight polymer to the second high molecular weight polymer. As described further herein, the macromolecular block copolymer formed according to the process illustrated in FIG. 1 includes flexible segment(s) and rigid segment(s) along the length of an article. The ability to vary the flexibility/rigidity along the length of the article may be useful in various applications that benefit from a transition of conformity (e.g., as a reinforcement for a multi-layered rubber cooling hose for a water-cooled computing system), as illustrated and further described herein with respect to the example of FIG. 4.

The first chemical reaction of FIG. 1 illustrates an example of a process of forming a rigid thermoplastic polymer that may be used to form one or more rigid segments of a macromolecular block copolymer. In the example of FIG. 1, the rigid thermoplastic polymer includes a polystyrene (PS) polymer that is formed by polymerizing suitable monomers. FIG. 1 further shows that the PS polymer includes functional side chains (designated by the letter R), where the R groups are functionalities that do not react during the polymerization of the first high molecular weight polymer.

In FIG. 1, the integer m is used to designate a first portion of the first high molecular weight polymer that does not include the R groups, and the integer n is used to designate a second portion of the first high molecular weight polymer that includes the R groups. The resultant polymer depicted on the right side of the first chemical reaction in FIG. 1 is a high molecular weight polystyrene material where m and n are selected based on a degree of reaction to bond the polystyrene to a particular polymeric matrix (not shown in FIG. 1). As described further herein, the functionalized starting polymers allow the polymer to bond with the particular polymeric matrix after formation of the macromolecular block copolymer structure. As an illustrative, non-limiting example, the R groups of the first high molecular weight polymer may be norbornene functional groups to enable chemical bonding of the high molecular weight polymer to a polymeric matrix material, such as EPDM rubber. In other cases, the side-chain functional groups may include norbornenes, amines, hydroxyls, or combinations thereof (among other alternatives) that may be selected for a particular type of polymer matrix material.

The second chemical reaction of FIG. 1 illustrates an example of a process of forming a flexible thermoplastic polymer that may be used to form one or more flexible segments of a macromolecular block copolymer. In the example of FIG. 1, the flexible thermoplastic polymer includes a linear low density polyethylene (LLDPE) polymer that is formed by polymerizing suitable monomers. FIG. 1 further shows that the LLDPE polymer includes functional side chains (designated as R'), where the R' groups are functionalities that do not react during the polymerization of the second high molecular weight polymer.

In FIG. 1, the integer x is used to designate a first portion of the second high molecular weight polymer that does not include the R' groups, and the integer y is used to designate a second portion of the second high molecular weight polymer that includes the R' groups. The resultant polymer depicted on the right side of the second chemical reaction of FIG. 1 is a high molecular weight polyethylene where x and y are selected based on degree of reaction to bond the high molecular weight polyethylene polymer to a particular polymeric matrix (not shown in FIG. 1). As an illustrative, non-limiting example, the R' groups of the second high molecular weight polymer may be norbornene functional groups to enable chemical bonding of the high molecular weight polymer to a polymeric matrix material, such as EPDM rubber. In other cases, the side-chain functional groups may include norbornenes, amines, hydroxyls, or combinations thereof (among other alternatives) that may be selected for a particular type of polymer matrix material.

The third chemical reaction of FIG. 1 illustrates an example of a process of forming a macromolecular block copolymer from the two high molecular weight polymers formed in the first and second chemical reactions of FIG. 1. As illustrated and further described herein with respect to FIG. 2 and FIGS. 3A-3D, the two high molecular weight polymers may be joined together through a coupling/manufacturing process (e.g., reactive extrusion) in which the two polymers are free to covalently bond at the end of the processing of the first article. This creates a long chain polymer where each portion of the polymer serves as a block in the macromolecular block copolymer. In some instances, a small block of coupling agent may be needed to join non-like polymers together. The resultant article then has flexible and rigid segments that can be used in articles of manufacture where flexibility and rigidity is desired. Here, the resultant macromolecular block copolymer has both rigid and flexible macromolecular block groups. Each block is of high molecular weight where each polymer would have generally been used previously in standalone applications.

Thus, FIG. 1 illustrates an example of a process of forming a macromolecular block copolymer. The macromolecular block copolymer of FIG. 1 may be used in various applications where flexibility is desirable along some segment(s) and rigidity is desirable along other segment(s). While FIG. 1 depicts an example of a PS-LLDPE macromolecular block copolymer, in other cases, the macromolecular block copolymers of the present disclosure may include alternative types and/or numbers of high molecular weight polymers. Further, as previously described herein, the particular type of side-chain functional groups and/or relative portions of the high molecular weight polymers that include the side-chain functional groups may be selected based on the particular polymeric matrix material.

FIG. 2 is a diagram 200 that illustrates an example of an extrusion setup that includes multiple extruders to generate macromolecular block copolymers. In the example of FIG. 2, the extrusion setup includes a first extruder 202 (identified as "Extruder(1)" in FIG. 2) and a second extruder 204 (identified as "Extruder(2)" in FIG. 2). In alternative embodiments, more than two extruders may be used. As illustrated and further described herein with respect to FIGS. 3A-3D, a first polymer may be extruded through the first extruder 202 into a joiner 206 to be joined to a second polymer that is extruded through the second extruder 204 into the joiner 206. While not shown in FIG. 2, the extrusion process may be controlled via a computing system that includes software, hardware, or a combination thereof that is configurable to extrude a particular material in a fashion that will accurately extrude an appropriate length of material.

FIG. 2 illustrates that the first extruder 202 may be placed next to the second extruder 204, with each of the extruders 202, 204 utilizing its own extrusion die. Each of the extruders 202, 204 contains a different material, and the parameters of the extruders 202, 204 are set up such that the polymers can be extruded through the machines. The extrusion process starts with one polymer being extruded to form a first segment, such as a rigid segment of a reinforcement. As that rigid section is being extruded, the length of the final extruded product has already been calculated to compensate for shrinkage and other dimension-changing properties. Next, in order to transition from a rigid section to a flexible section, the second extruder 204 begins to extrude such that it is offset in order to meet at the end of the rigid section block. As the second extrusion passes through its die, the material is sent through the joiner 206 where the material from the rigid section is almost finished passing such that the start of the flexible section is timed to allow covalent bonding between the end of the rigid section and the start of the flexible section.

In some cases, a third extruder (not shown) may be used to covalently bond the two polymers together via a short section of transition polymer. The transition polymer is selected based on the two polymers being joined but generally has functionalities of both polymers present in order to induce polymerization between the two sections. After extruding the flexible section in a similar fashion as the rigid section, additional rigid and/or flexible section(s) can be extruded utilizing this process. The final article of manufacture is an extruded material that contains both rigid blocks and flexible blocks using one material at a time. FIGS.

3A-3D illustrate an example of multiple stages of the aforementioned extrusion process.

Figure 3A:
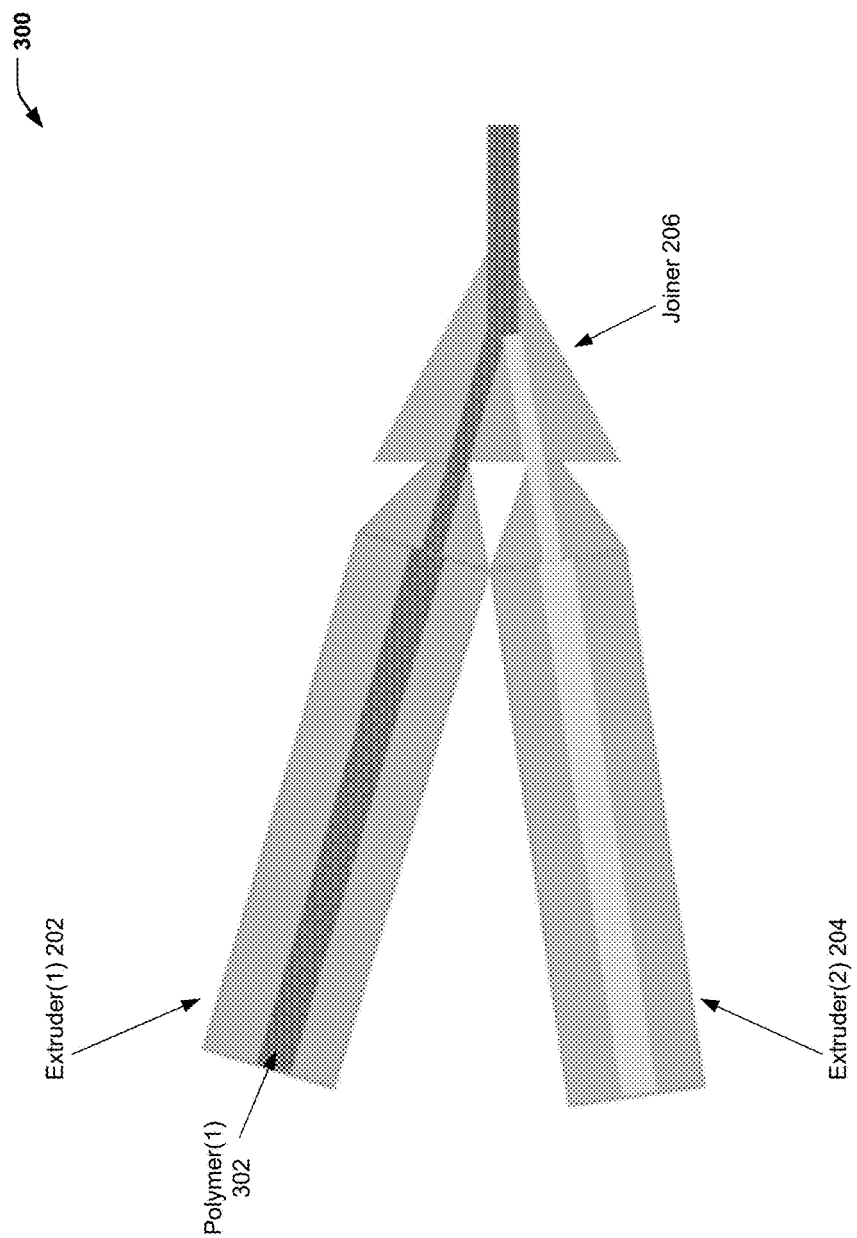
FIG. 3A is a diagram of an example of a first stage of an extrusion process to generate a macromolecular block copolymer where a first polymer is extruded through a first extruder, according to one embodiment.

FIG. 3A is a diagram 300 that illustrates an example of a first stage of an extrusion process in which a first polymer 302 (identified as "Polymer(1)" in FIG. 3A) is extruded using the first extruder 202. In a particular embodiment, the first polymer 302 that is extruded using the first extruder 202 corresponds to the first high molecular weight polymer depicted on the right side of the first chemical reaction of FIG. 1 (e.g., a high molecular weight polystyrene polymer).

Figure 3B:
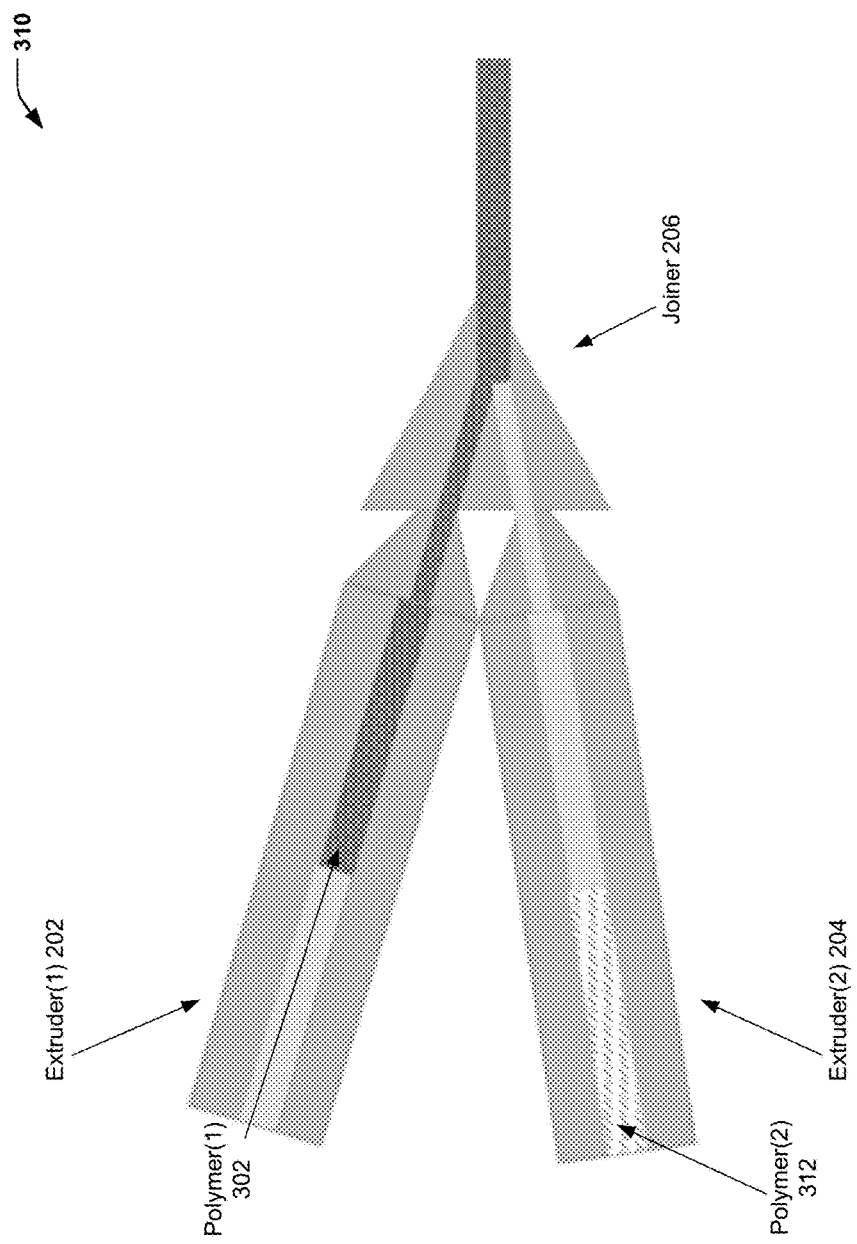
FIG. 3B is a diagram of an example of a second stage of the extrusion process where a second polymer is starting to extrude through a second extruder while the first polymer is extruded through the first extruder, according to one embodiment.
Figure 3C:
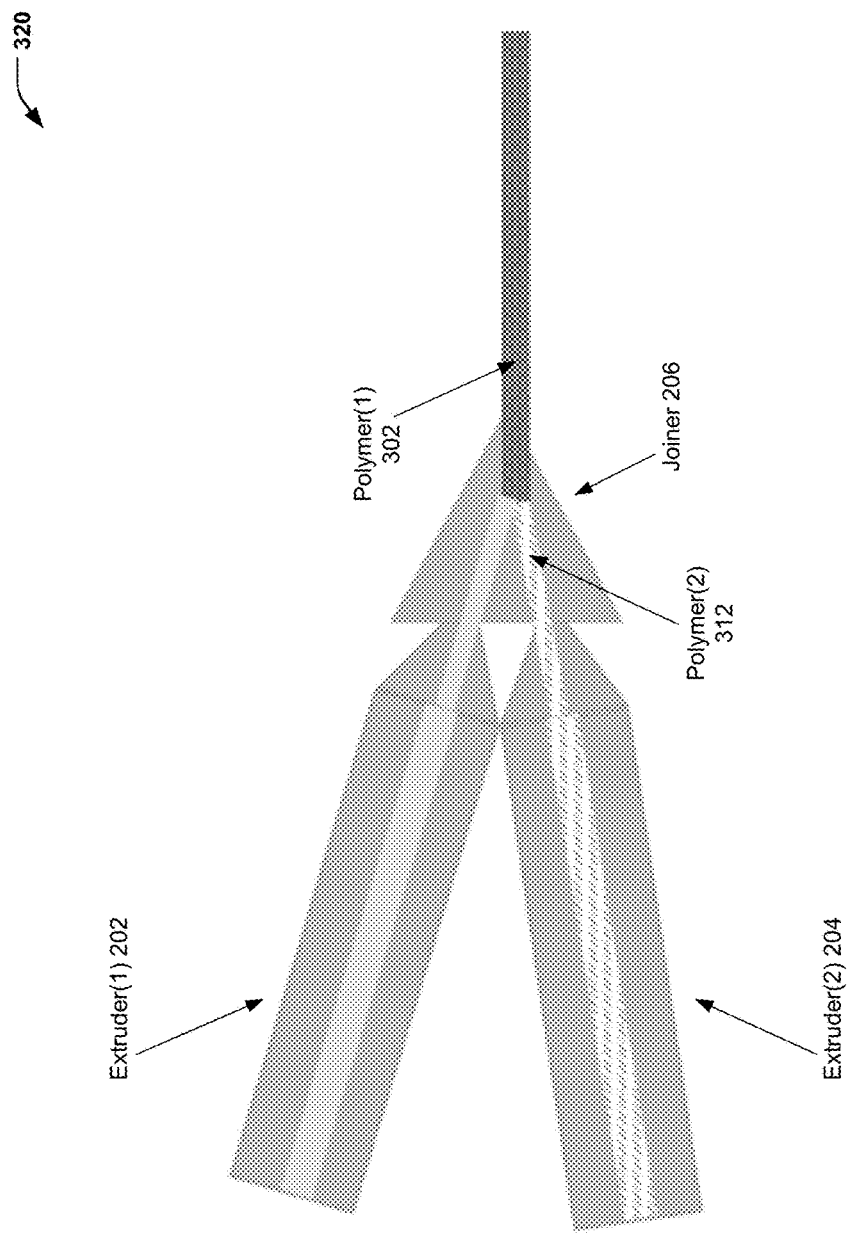
FIG. 3C is a diagram of an example of a third stage of the extrusion process where the first polymer is no longer extruded through the first extruder, and the second polymer extruded through the second extruder meets at the end of the first polymer to join the first polymer to the second polymer, according to one embodiment.

FIG. 3B is a diagram 310 that illustrates an example of a second stage of the extrusion process in which a second polymer 312 (identified as "Polymer(2)" in FIG. 3B) is starting to extrude through the second extruder 204 such that the end of the first polymer 302 meets the start of the second polymer 312 at the joiner 206 (as shown in FIG. 3C). In a particular embodiment, the second polymer 312 that is extruded using the second extruder 204 corresponds to the second high molecular weight polymer depicted on the right side of the second chemical reaction of FIG. 1 (e.g., a high molecular weight LLDPE polymer).

FIG. 3C is a diagram 320 that illustrates an example of a third stage of the extrusion process in which the first polymer 302 is no longer extruded and only the second polymer 312 is being extruded, meeting at the end of the first polymer 302 in the joiner 206.

While not shown in the example of FIG. 3C, in some cases, a joining/coupling agent (e.g., a short oligomeric chain) may be used to bond the end of the first polymer 302 to the end of the second polymer 312. To illustrate, in the case of a polystyrene polymer and a polyethylene polymer, the optional joining/coupling agent may be selected that includes a first functional group to bond to the polystyrene polymer and a second functional group to bond to the polyethylene polymer. As an illustrative, non-limiting example, the polystyrene polymer may have oxazoline groups, the polyethylene polymer may have carboxyl groups, and a coupling reaction may join the polystyrene polymer to the polyethylene polymer. In some cases, the joining/coupling agent may be extruded via one or more of the extruders 202, 204 (e.g., in the first extruder 202 at the end of the first polymer 302 and/or in the second extruder 204 at the start of the second polymer 312). Further, while not shown in the example of FIG. 3C, the joiner 206 may include an additional fluid interface (e.g., a third extruder) to enable insertion of the optional joining/coupling agent.

Figure 3D:
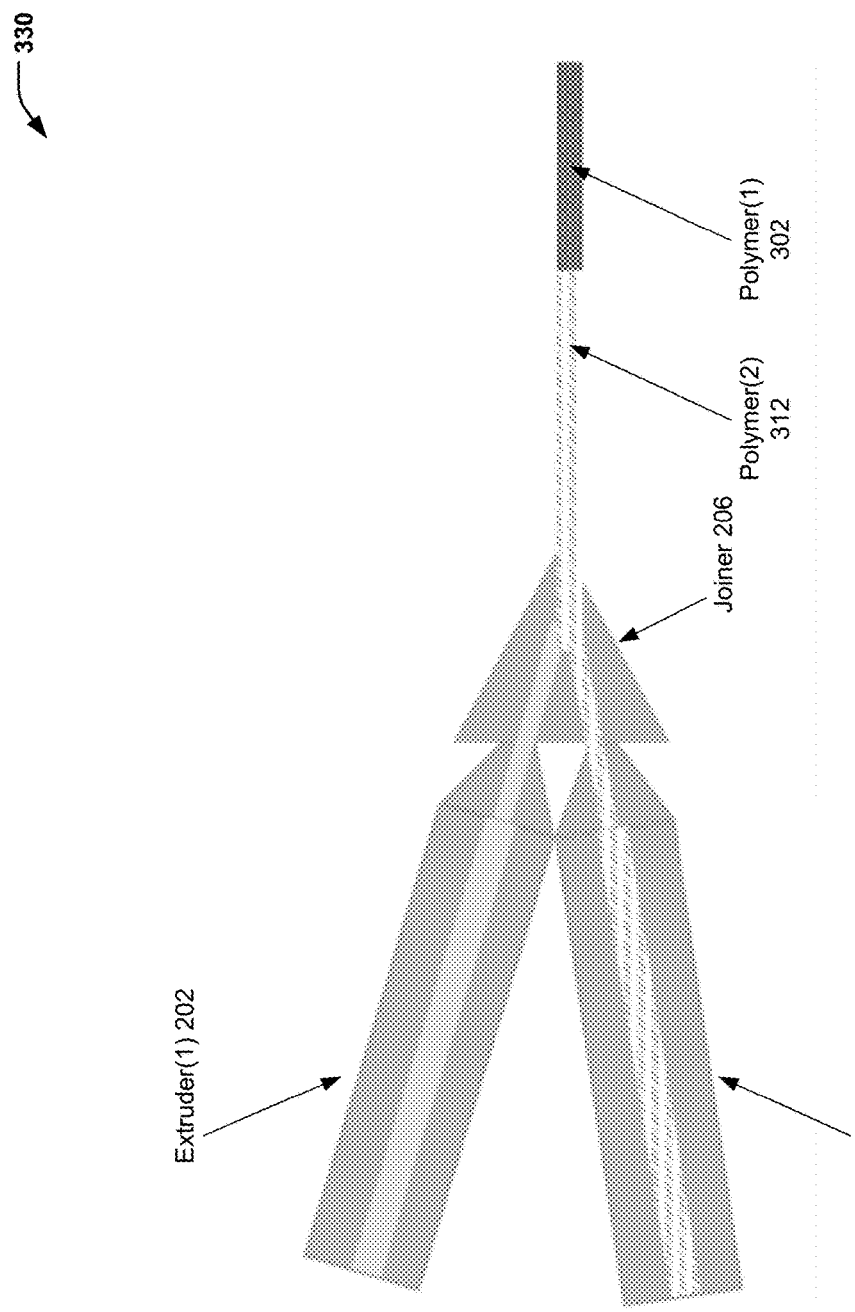
FIG. 3D is a diagram of an example of a fourth stage of the extrusion process where the second polymer continues to be extruded through the second extruder, according to one embodiment.

FIG. 3D is a diagram 330 that illustrates an example of a fourth stage of the extrusion process in which the second polymer 312 is being extruded.

In a particular embodiment, the first polymer 302 that is extruded via the first extruder 202 has a first length in which relatively rigid material properties are desirable for a particular application, and the second polymer 312 has a second length in which relatively flexible material properties are desirable for the particular application. While not shown in FIG. 3D, after extruding the second length of the second polymer 312, a third length of the first polymer 302 may be extruded through the first extruder 202 to form a macromolecular block copolymer that includes a first rigid segment, a flexible segment, and a second rigid segment (e.g., the reinforcement illustrated in FIG. 4).

Thus, FIGS. 3A-3D illustrate an example of multiple stages of an extrusion process that may be used to form the macromolecular block copolymers of the present disclosure. In some cases, the extrusion process may be used to form additional segments of high molecular weight polymers (such as an additional rigid segment following a flexible segment).

FIG. 4 is a diagram 400 that illustrates an example of a macromolecular block copolymer reinforcement (e.g., an inner layer reinforcement for a multi-layered rubber cooling hose of a liquid-cooled computing system). In the example of FIG. 4, the reinforcement includes a first rigid block 402 (identified as "Rigid Block(1)" in FIG. 4), a flexible block 404, and a second rigid block 406 (identified as "Rigid Block(2)" in FIG. 4). In other cases, the reinforcement may include an alternative number and/or arrangement of rigid/flexible blocks.

In a particular embodiment, the first rigid block 402 corresponds to the first polymer 302 that is extruded via the first extruder 202 (e.g., the high molecular weight PS polymer of FIG. 1), and the flexible block 404 corresponds to the second polymer 312 that is extruded via the second extruder 204 (e.g., the second high molecular weight LLDPE polymer of FIG. 1), as illustrated and further described herein with respect to FIGS. 3A-3D. In some cases, the second rigid block 406 may correspond to the first polymer 302 (that may be extruded via the first extruder 202 after extrusion of the second polymer 312, not shown in FIG. 3D).

In the example of FIG. 4, the first rigid block 402 has a first length 410 (identified as "Length(1)" in FIG. 4), the flexible block 404 has a second length 412 (identified as "Length(2)" in FIG. 4), and the second rigid block 406 has a third length 414 (identified as "Length(3)" in FIG. 4). While FIG. 4 illustrates an example of a linear reinforcement, it will be appreciated that the processes described herein may be used to form macromolecular block copolymers for use in formed hose designs (e.g., "S" shaped formed hose designs) with alternative numbers and/or arrangements of rigid/flexible segments that may be customized for a particular application (e.g., for a particular liquid-cooled computing system design).

As an illustrative, non-limiting example, the reinforcement of FIG. 4 may be used as an inner layer reinforcement for a five foot linear rubber cooling hose. In some cases, it may be desirable to have one foot rigid sections on both ends of the linear rubber cooling hose. In this example, the first length 410 of first rigid block 402 is one foot, the second length 412 is three feet, and the third length 414 is one foot. The rigid blocks 402, 404 may improve the ability to couple between the hose and a termination, such as a barb/clamp, resulting in improved seal security due to improved grip around the termination. As shown at the bottom of FIG. 4, the flexible block 404 may enable bending (e.g., around corners in a liquid-cooled computing system).

In a particular embodiment, a reinforcement having a similar design to the reinforcement illustrated in FIG. 4 may be used to reinforce a linear hose, and the reinforced linear hose may satisfy particular bend radius criteria. As an example, for a one-quarter inch hose, the bend radius criteria may be a bend radius of at least 0.75 inches (without kinking). As another example, for a one-half inch hose, the bend radius criteria may be a bend radius of at least 2.5 inches (without kinking). As a further example, for a one inch hose, the bend radius criteria may be a bend radius of at least 6 inches (without kinking).

Cord-reinforced rubber structures, such as cord-reinforced rubber hoses, provide strength and durability for water cooling systems whereas non-reinforced hoses tend to sag and eventually kink over time. Typically, cord reinforcement includes steel cord that limits the flexibility of the hoses. Thermoplastics represent a suitable replacement but are generally lacking due to a single set of material properties (e.g., flexibility or rigidity) existing along the length of the hose or article. The reinforcement material illustrated in FIG. 4 is an example of a cord replacement that enables the hose to have rigid ends while also having a flexible middle section for improved bending and shaping (as shown at the bottom of FIG. 4).

In manufacturing of a thermoplastic corded rubber hose using the macromolecular block copolymers of the present disclosure, a first hose layer may be extruded onto a mandrel and partially cured. Next, the cord replacement may be wrapped around the hose. Next, the outer cover material may be extruded over the top of the hose, and the whole hose assembly may be cured using standard curing conditions. During curing, the functionalities on the side chains of the macromolecular block copolymer reinforcement react with the rubber to form covalent bonds, reducing or eliminating delamination. The hose may then be cured to desired dimensions such that cuts are made in the rigid regions and not the flexible regions. This also allows for better termination of the hose while providing the desired flexibility.

Thus, FIG. 4 illustrates an example of an article of manufacture (e.g., a reinforcement for a multi-layered rubber cooling hose) formed from the macromolecular block copolymers of the present disclosure. The ability to vary the material properties (e.g., flexibility/rigidity) along the length of the article enables improved bending and shaping, which may be useful in some liquid-cooled computing systems (among other possible alternative uses).

Referring to FIG. 5, a flow diagram illustrates an example of a process 500 of forming an article of manufacture that includes a macromolecular block copolymer of the present disclosure. In a particular embodiment, the macromolecular block copolymer may correspond to the example PS-LLDPE macromolecular block copolymer of FIG. 1. In a particular embodiment, the macromolecular block copolymer may be formed using the extrusion setup depicted in FIG. 2, according to the example extrusion process depicted in FIGS. 3A-3D. In a particular embodiment, the macromolecular block copolymer may be used as a reinforcement (e.g., for a multi-layered rubber water-cooling hose of a water-cooled computing system) that includes flexible and rigid sections, such as the macromolecular block copolymer reinforcement depicted in the example of FIG. 4.

The process 500 includes forming a first high molecular weight polymer using a first extruder of an extruder system that includes multiple extruders, at 502. The first extruded high molecular weight polymer has a first length terminating at a joiner of the extruder system. For example, the extruder system may correspond to the extruder setup depicted in FIG. 2 that includes the first extruder 202, the second extruder 204, and the joiner 206. As shown in the example of FIGS. 3A-3C, the first extruder 202 may be used to form the first polymer 302 terminating at the joiner 206. In some cases, the first polymer 302 may correspond to the first high molecular weight PS polymer depicted in FIG. 1. In a particular embodiment, the first polymer 302 extruded using the first extruder 202 may correspond to the first rigid block 402 of FIG. 4 that has the first length 410.

The process 500 includes forming a second high molecular weight polymer using a second extruder of the extruder system, at 504. The second extruded high molecular weight polymer has a second length terminating at the joiner of the extruder system. For example, as shown in the example of FIGS. 3B and 3C, the second extruder 204 may be used to form the second polymer 312 terminating at the joiner 206. In some cases, the second polymer 312 may correspond to the second high molecular weight LLDPE polymer depicted in FIG. 1. In a particular embodiment, the second polymer 312 extruded using the second extruder 204 may correspond to the flexible block 404 of FIG. 4 that has the second length 412.

The process 500 includes bonding the first extruded high molecular weight polymer to the second high molecular weight polymer at the joiner to form a macromolecular block copolymer, at 506. The macromolecular block copolymer has a first segment of the first length and a second segment of the second length. For example, referring to FIG. 3C, the first polymer 302 may be bonded to the second polymer 312 at the joiner 206.

In the particular embodiment illustrated in FIG. 5, the process 500 also includes forming a third high molecular weight polymer using one of the extruders of the extruder system, at 508. The third extruded high molecular weight polymer has a third length terminating at the joiner. For example, while not shown in FIG. 3D, after extruding the second polymer 312, the first extruder 202 (or another extruder, in cases of extruder systems with more than two extruders) may be used to form a third segment of the first polymer 302 terminating at the joiner 206. In some cases, the first polymer 302 may correspond to the first high molecular weight PS polymer depicted in FIG. 1.

In the particular embodiment illustrated in FIG. 5, the process 500 further includes bonding the third high molecular weight polymer to the second high molecular weight polymer to form a third segment of the macromolecular block copolymer, at 510. In a particular embodiment, the third segment of the first polymer 302 extruded using the first extruder 202 may correspond to the second rigid block 406 of FIG. 4 that has the third length 414.

Thus, FIG. 5 illustrates an example of a process of forming an article of manufacture that includes a macromolecular block copolymer. In the particular embodiment illustrated in FIG. 5, the macromolecular block copolymer includes a first segment (e.g., a rigid segment), a second segment (e.g., a flexible segment), and a third segment (e.g., a second rigid segment). In other cases, the macromolecular block copolymer may include an alternative number of segments, an alternative arrangement of segments, alternative numbers of high molecular weight polymers, or a combination thereof.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. An article of manufacture, comprising:
   a block copolymer comprising:
   a first extruded polymer having a first characteristic rigidity along a first length; and
   at least a portion of a second extruded polymer bonded to at least a portion of the first extruded polymer, the second extruded polymer having a second characteristic rigidity along a second length that is different from the first characteristic rigidity, wherein at least one of the first extruded polymer or the second extruded polymer includes side-chain functional groups for chemically bonding the block copolymer to a polymeric matrix material.

2. The article of manufacture of claim 1, wherein the polymeric matrix material includes ethylene propylene diene monomer (EPDM) rubber.

3. The article of manufacture of claim 1, wherein the side-chain functional groups include amine groups, norbornene groups, hydroxyl groups, or a combination thereof.

4. The article of manufacture of claim 1, wherein the block copolymer further comprises at least a portion of a third extruded polymer bonded to at least a portion of the second extruded polymer, the third extruded polymer having a third characteristic rigidity along a third length that is different from the second characteristic rigidity.

5. The article of manufacture of claim 4, wherein the third characteristic rigidity corresponds to the first characteristic rigidity.

6. The article of manufacture of claim 1, wherein the first extruded polymer includes a polystyrene (PS) polymer, and wherein the second extruded polymer includes a linear low density polyethylene (LLDPE) polymer.

7. The article of manufacture of claim 6, wherein the PS polymer has an oxazoline group.

8. The article of manufacture of claim 6, wherein the LLDPE polymer has a carboxyl group.

9. An article of manufacture, comprising:
  a block copolymer comprising:
    a first extruded polymer having a first characteristic rigidity along a first length, wherein the first extruded polymer includes a polystyrene (PS) polymer; and
    at least a portion of a second extruded polymer bonded to at least a portion of the first extruded polymer, the second extruded polymer having a second characteristic rigidity along a second length that is different from the first characteristic rigidity, wherein the second extruded polymer includes a linear low density polyethylene (LLDPE) polymer, and wherein at least one of the PS polymer or the LLDPE polymer includes side-chain functional groups for chemically bonding the block copolymer to a polymeric matrix material.

10. The article of manufacture of claim 9, wherein the polymeric matrix material includes ethylene propylene diene monomer (EPDM) rubber.

11. The article of manufacture of claim 9, wherein the side-chain functional groups include amine groups, norbornene groups, hydroxyl groups, or a combination thereof.

12. The article of manufacture of claim 9, wherein the PS polymer has an oxazoline group.

13. The article of manufacture of claim 9, wherein the LLDPE polymer has a carboxyl group.

14. The article of manufacture of claim 9, wherein the block copolymer further comprises at least a portion of a third extruded polymer bonded to at least a portion of the second extruded polymer, the third extruded polymer having a third characteristic rigidity along a third length that is different from the second characteristic rigidity.

15. The article of manufacture of claim 14, wherein the third characteristic rigidity corresponds to the first characteristic rigidity.

16. An article of manufacture, comprising:
  a block copolymer comprising:
    a first extruded polymer having a first characteristic rigidity along a first length, wherein the first extruded polymer includes a polystyrene (PS) polymer;
    at least a portion of a second extruded polymer bonded to at least a portion of the first extruded polymer, the second extruded polymer having a second characteristic rigidity along a second length that is different from the first characteristic rigidity, wherein the second extruded polymer includes a linear low density polyethylene (LLDPE) polymer, and wherein at least one of the PS polymer or the LLDPE polymer includes side-chain functional groups for chemically bonding the block copolymer to a polymeric matrix material; and
    a third extruded polymer bonded to the second extruded polymer, the third extruded polymer having a third characteristic rigidity along a third length that is different from the second characteristic rigidity.

17. The article of manufacture of claim 16, wherein the third characteristic rigidity corresponds to the first characteristic rigidity.

18. The article of manufacture of claim 16, wherein the polymeric matrix material includes ethylene propylene diene monomer (EPDM) rubber.

19. The article of manufacture of claim 16, wherein the PS polymer has an oxazoline group and the LLDPE polymer has a carboxyl group.

* * * * *